United States Patent [19]

Hinrichs et al.

[11] Patent Number: 5,322,208
[45] Date of Patent: Jun. 21, 1994

[54] METHOD FOR WELDING VEHICLE FRAME

[75] Inventors: John F. Hinrichs, Menomonee Falls; Michael S. Lasky, New Berlin; Jeffrey S. Noruk, Glendale, all of Wis.; Stephen D. Hall, Galloway, Ohio

[73] Assignee: A. O. Smith Corporation, Milwaukee, Wis.

[21] Appl. No.: 911,225

[22] Filed: Jul. 9, 1992

[51] Int. Cl.⁵ .............................................. B23K 31/02
[52] U.S. Cl. .................................... 228/182; 228/214; 29/897.2
[58] Field of Search ............................ 228/182, 214; 219/137 R; 296/29; 29/897.2; 248/205.1

[56] References Cited

U.S. PATENT DOCUMENTS 4,863,091 9/1989 Dubois ................................ 228/5.7
5,037,024 8/1991 Minato et al. .................... 228/125

FOREIGN PATENT DOCUMENTS 50-21425 7/1975 Japan ................................ 228/125

OTHER PUBLICATIONS

Metals Handbook Ninth Edition, vol. 6, pp. 91-94, 110, 132, 135, 175, copyright 1983.

Primary Examiner—Samuel M. Heinrich
Attorney, Agent, or Firm—David R. Price; James Earl Lowe, Jr.

[57] ABSTRACT

A method for assembling a motor vehicle frame including a rail having a generally planar outer surface and upper and lower ends, and a bracket including a wall portion having a lower end, the method comprising the steps of positioning the bracket against the side rail outer surface so that the wall portion extends transversely to the rail outer surface, and welding the bracket to the rail by providing a weld bead along the junction between the wall portion and the rail outer surface and extending the weld bead along the rail outer surface substantially beyond the lower end of the wall portion to the lower end of the rail.

13 Claims, 1 Drawing Sheet

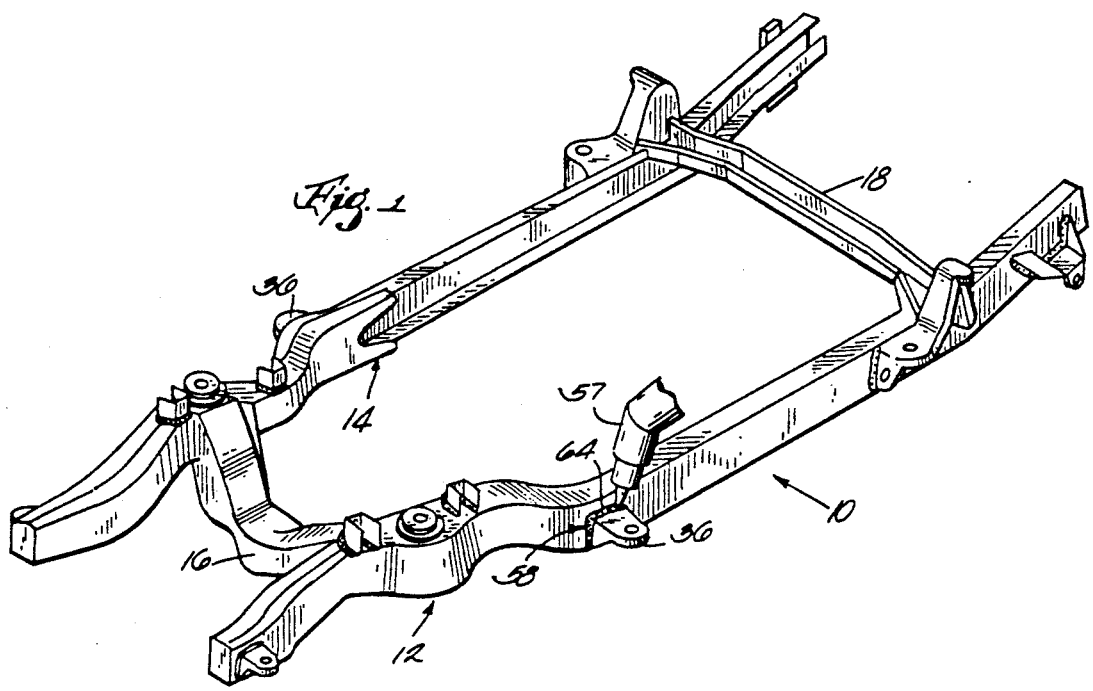

5,322,208

METHOD FOR WELDING VEHICLE FRAME

BACKGROUND OF THE INVENTION

The invention relates generally to welded parts, and more particularly to welded parts such as brackets on a truck frame, including a weld arrangement configured to improve strength and fatigue properties of the welded part.

A motor vehicle frame generally includes a pair of spaced apart side rails which extend the length of a vehicle and which are connected by laterally extending cross members to form a rigid structure. Various parts, such as body mount brackets for example, are welded to the side rails. A typical body mount bracket is generally shaped as an inverted U and includes a pair of spaced apart vertical side legs or walls and a horizontal top wall. The body mount bracket is welded to the side rail by applying a weld bead along the outer periphery of the U, terminating the weld bead about one quarter inch or more before reaching the lower ends of the bracket side walls.

SUMMARY OF THE INVENTION

The invention provides an improved method for welding a body mount bracket or other member (such as a cross-member) to a side rail of a vehicle frame. The invention uses a welding technique that strategically positions weld bead portions to improve strength and fatigue performance of the weld.

More specifically, the invention comprises the step of providing a first weld around the periphery of the body mount bracket or other member at the seam between the bracket and the side rail, and extending the opposite ends of the weld past or beyond the lower ends of the bracket side wall portions. This is referred to as the "weld past" technique. By extending the weld ends past the ends of bracket side wall portions, the opposite weld ends are displaced to regions of the side rail that are subjected to lower stress than are the highly stressed areas adjacent the lower ends of the side wall portions. This reduces the occurrence of cracks, and particularly toe cracks in the weld at the tips of the weld ends. The invention also comprises the step of providing a pair of reinforcement welds along the inside surface of each side wall portion, the reinforcement welds extending past the lower ends of the side wall portions to further stiffen the joint between the body mount bracket and the side rail and to seal off the joint. To prevent cracks from forming on the back side of the side rail, a pair of welds are also provided on the back side of the side rail in opposed relation directly opposite the bracket wall portions to further stiffen the side rail web and to thicken the web in areas of relatively high localized stress (e.g. the web area adjacent the lower ends of the bracket side wall portions).

Other features and advantages of the invention will become apparent to those skilled in the art upon review of the following detailed description, claims and drawings.

DESCRIPTION OF THE DRAWINGS

FIG. 1 is a top perspective view of a motor vehicle frame shown with a weld gun welding a body mount bracket to a side rail in accordance with the invention.

FIG. 2 is a partial, bottom perspective view of the frame illustrated in FIG. 1.

FIG. 3 is a sectional view taken along line 3—3 in FIG. 2.

FIG. 4 is a view similar to FIG. 2 showing an alternative embodiment of the invention.

FIG. 5 is a sectional view taken along line 5—5 in FIG. 4.

FIG. 6 is a rear view of a frame showing a second alternative embodiment of the invention.

FIG. 7 is a sectional view taken along line 7—7 in FIG. 6.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Illustrated in FIG. 1 is a vehicle frame 10 which embodies the invention and which forms part of a chassis for a vehicle (not shown). While the frame 10 can be used in various applications, the illustrated frame 10 is a truck frame.

The frame 10 comprises a pair of spaced apart and parallel side bars or side rails 12 and 14 interconnected by a pair of laterally extending cross-members 16 and 18. The cross-members 16 and 18 are welded or otherwise suitably secured between the side rails 12 and 14 to form a rigid frame structure. The side rails 12 and 14 are substantially mirror images of each other, and only the side rail 12 will be described further.

The side rail 12 is channel-shaped and includes a generally vertical web 22 having a generally planar inner surface 24, an opposite generally planar outer surface 26, and upper and lower ends 28 and 30, respectively. The side rail 12 also includes an upper flange 32 extending inwardly from the upper end 28 of the web 22 and a lower flange 34 extending inwardly from the lower end 30 of the web 22.

The frame 10 also comprises a plurality of bracket members including body mount brackets 36 which serve to support the vehicle body (not shown). Each body mount bracket 36 is welded to a corresponding one of the side rails 12 and 14, as is more fully explained hereinafter. The brackets 36 are substantially identical, and only one of the brackets 36, which is attached to the side rail 12, will be described in detail.

As shown in FIG. 2, the body mount bracket 36 includes spaced apart first and second gusset members or side wall portions 38 and 40, respectively. The first and second wall portions 38 and 40 each include an inwardly facing side 42 and an opposite outwardly facing side 44, an upper end 46 spaced below the upper end 28 of the side rail 12, a lower end 48 spaced above the lower end 30 of the side rail 12. The first and second wall portions 38 and 40 each also include a generally planar end surface 49 (FIG. 3) abutting the outer surface 26 of the side rail 12. When the body mount bracket 36 is properly positioned on the side rail 12, the first and second wall portions 38 and 40 are generally vertically oriented and extend transversely, and preferably perpendicularly, from the side rail outer surface 26.

The body mount bracket 36 also includes a generally horizontal top wall portion 50 which includes an attachment hole 52 and which extends normally between the upper ends 46 of the first and second wall portions 38 and 40. The top wall portion 50 has a generally planar end surface (not shown) abutting the outer surface 26 of the side rail 12. The bracket 36 also includes a semi-annular flange portion 56 which extends downwardly from the outer edge of the top wall portion 50 and which is coextensive with the first and second wall portions 38 and 40.

The body mount bracket 36 is welded to the side rail 12, preferably with an automatic welding apparatus including a robotically controlled weld gun 57. The use of a robotic welder is important to quickly and strategically place the various weld bead portions and provides excellent control over weld parameters which are otherwise difficult to precisely control with manual welding units.

The body mount bracket 36 is welded to the side rail 12 with an outer weld 58 that is located on the outer periphery of the bracket 36 and that extends along the junction between the bracket 36 and the side rail outer surface 26. More specifically, the outer weld 58 includes a first weld bead portion 60 on the outwardly facing side 44 of the first wall portion 38 along the junction between the side rail outer surface 26 and the first wall portion 38. The outer weld 58 also includes a second weld bead portion 62 on the outwardly facing side 44 of the second wall portion 40 along the junction between the second wall portion 40 and the side rail outer surface 26. The outer weld 58 further includes a third weld bead portion 68 extending along the junction between the top wall portion 50 and the side rail outer surface 26.

As shown in FIG. 2, the first and second weld bead portions 60 and 62 also extend along the side rail outer surface 26 past the lower ends 48 of the first and second wall portions 38 and 40. The first and second weld bead portions 60 and 62 terminate at weld ends 66 and 68, respectively. By employing this "weld past" technique, the weld ends 66 and 68 are displaced from the areas of generally high localized stress adjacent the end corners of the first and second wall portions 38 and 40 to areas of relatively lower stress near the lower end 30 of the web 22. This reduces crack formation and propagation at the weld ends 66 and 68. Additionally, removing the weld ends 66 and 68 from areas of high localized stress avoids stress concentration encountered in prior art arrangements in which the welds are not extended beyond the lower ends of a bracket. While the first and second weld bead portions 60 and 62 can be terminated at various locations on the side rail outer surface 26, it is preferred that they be extended substantially to the lower end 30 of the side rail web 22, and more preferably to the corner radius of the lower flange 34.

In an alternative embodiment of the invention, as shown in FIGS. 4 and 5, the series of welds used to join the body mount bracket 36 to the side rail 12 also includes reinforcing welds on the inside of the side wall portions 38 and 40 of the body mount bracket 36. These reinforcing welds include fourth and fifth weld bead portions 70 and 72 between the side rail outer surface 26 and the inwardly facing sides 42 of the first and second wall portions 38 and 40, respectively. The fourth and fifth weld bead portions 70 and 72 extend from a point spaced above the lower ends 48 of the first and second wall portions 38 and 40 to a point substantially beyond the lower ends 48, and preferably to the radius corner of the lower flange 34. The fourth and fifth weld bead portions 70 and 72 stiffen the weld and seal off the seam between the body mount bracket 36 and the side rail 12.

In a further alternative embodiment of the invention, as shown in FIGS. 6 and 7, the series of welds further includes backside welds including sixth and seventh weld bead portions 74 and 76 located on the side rail inner surface 24 in opposed, generally parallel relation to the first and second weld bead portions 60 and 62, respectively. Like the fourth and fifth weld bead portions 70 and 72, the sixth and seventh weld bead portions 74 and 76 each extend from a point above the lower ends 48 of the first and second wall portions 38 and 40 to a point beyond the lower ends 48, and preferably substantially to the lower end 30 of the side rail web 22. The sixth and seventh weld bead portions 74 and 76 stiffen the side rail web 22 and thicken the web 22 in the area subjected to increased localized stress due to loading of the body mount bracket 36. This helps prevent crack formation and propagation on the side rail inner surface 24.

To assemble the frame 10, the body mount bracket 36 is first positioned against the side rail 12 and between the upper and lower ends 28 and 30 of the web 22 with the first and second wall portions 38 and 40 oriented vertically and with the end surfaces 49 abutting the side rail outer surface 26. While the body mount bracket 36 is preferably positioned against the side rail outer surface 26, it will be understood by those skilled in the art that welding techniques could be employed to accommodate a small space between the body mount bracket 36 and the side rail outer surface 26.

After the body mount bracket 36 is suitably placed against the side rail 12, the bracket 36 is welded to the side rail 12 by providing the above-described weld bead portions. In particular, the first and second weld bead portions 60 and 62 are provided between the outwardly facing sides 44 of the first and second wall portions 38 and 40 and the side rail outer surface 26 and are continued substantially to the lower end 30 of the web 22. The third weld bead portion 68 is provided between the top wall portion 50 and the side rail outer surface 26. Preferably, the outer weld 58 is applied as a continuous weld bead extending between the weld ends 66 and 68 and including each of the first, second and third weld bead portions 60, 62, and 64. Of course, in other arrangements, the outer weld 58 could include a series of discrete weld beads. The fourth and fifth weld bead portions 70 and 72 are then provided by applying these weld bead portions between the inwardly facing sides 42 of the first and second wall portions 38 and 40 and the side rail outer surface 26. Like the first and second weld bead portions 60 and 62, the fourth and fifth weld bead portions 70 and 72 are welded past the ends 48 of the bracket 36 by extending these weld bead portions substantially to the lower end 30 of the web 22, as described above. While the outer weld 58 and the fourth and fifth weld bead portions 70 and 72 are shown as being separate welds, it should be understood that the continuous outer weld 58 could be extended to include the fourth and fifth weld bead portions 70 and 72. Finally, the sixth and seventh weld bead portions 74 and 76 are provided on the side rail inner surface 24 by applying these weld bead portions in opposed relation to the end surfaces 49 of the first and second wall portions 38 and 40 and by extending these weld bead portions from a point above the lower ends 48 of the bracket 36 substantially to the lower end 30 of the web 22, as described above. It will be further understood by those skilled in the art that the order of application of the weld bead portions can be varied.

It should be understood that the cross-members 16 and 18 or other types of brackets could also be secured to the side rails 12 and 14 using the above-described weld bead portions and "weld past" technique.

Various features of the invention are set forth in the following claims.

We claim:

1. A method for assembling a motor vehicle frame including a rail having a generally planar outer surface with a generally horizontal outer edge, and a member including a wall portion having a generally straight end surface, said method comprising the steps of positioning the member against the rail outer surface so that the wall portion extends transversely to the rail outer surface spaced from said rail outer edge, and the end surface of the wall portion substantially abuts the rail outer surface, and welding the member to the rail by providing a weld bead in a generally straight line along the junction between the wall portion and the rail outer surface and continuing to extend the weld bead along the rail outer surface along said generally straight line toward said rail outer edge substantially beyond the wall portion, so that said weld bead further stiffens the rail by thickening the rail beyond the wall portion.

2. A method for assembling a motor vehicle frame as set forth in claim 1 wherein the rail includes a generally vertical web having the outer surface and having upper and lower ends, wherein the member is positioned so that the wall portion extends generally vertically, wherein the wall portion includes upper and lower ends, and wherein said step of welding the member to the rail includes extending the weld bead beyond the lower end of the wall portion substantially to the lower end of the web.

3. A method for assembling a motor vehicle frame as set forth in claim 1 wherein the member includes a second wall portion spaced from and parallel to the first-mentioned wall portion, the second wall portion including an end surface, wherein the end surface of the second wall portion substantially abuts the rail outer surface when the member is positioned against the rail outer surface, and wherein said step of welding the member to the rail includes providing a weld bead along the junction between the second wall portion and the rail outer surface and extending the second-mentioned weld bead along the rail outer surface and substantially beyond the end surface of the second wall portion.

4. A method for assembling a motor vehicle frame as set forth in claim 3 wherein each of the first-mentioned and second-mentioned wall portions includes upper and lower ends, wherein the member includes a generally horizontal wall portion extending between the upper ends of the wall portions and having an end surface, wherein the end surface of the horizontal wall portion abuts the rail outer surface when the member is positioned against the rail outer surface, and wherein said step of welding the member to the side rail includes providing a weld bead along the junction between the horizontal wall portion and the rail outer surface, and extending each of the first-mentioned and second-mentioned weld beads substantially below the lower ends of the wall portions.

5. A method for assembling a motor vehicle frame as set forth in claim 1 wherein the wall portion has opposite sides, and wherein said step of welding the member to the rail includes providing the weld bead along the junction between the rail outer surface and the wall portion on one of the sides of the wall portion, and applying a second weld bead along the junction between the outer rail surface and the wall portion on the other of the sides of the wall portion, the second-mentioned weld bead extending along the rail outer surface substantially beyond the end surface of the wall portion.

6. A method for assembling a motor vehicle frame as set forth in claim 1 wherein the rail includes an inner surface opposite the outer surface, and wherein said method for assembling further comprises the step of providing a second weld bead to the rail inner surface in opposed relation to the first-mentioned weld bead and extending the second weld bead along the rail inner surface substantially beyond the end surface of the wall portion.

7. A method for assembling a motor vehicle frame as set forth in claim 1 wherein the member is a bracket.

8. A method for assembling a motor vehicle frame including a side rail having a generally vertical web including opposite generally planar inner and outer surfaces, upper and lower ends, an upper flange extending inwardly from the upper end, and a lower flange extending inwardly from the lower end, and a bracket including spaced apart generally vertical first and second wall portions, each of the first and second wall portions including upper and lower ends and opposite outwardly and inwardly facing sides, and a generally horizontal wall portion extending between the upper ends of the first and second wall portions, each of the first and second wall portions and the horizontal wall portion including an end surface portion, the end surface portions being coplanar to form a bracket end surface, said method for assembling comprising the steps of positioning the bracket against the side rail and between the upper and lower end of the side rail so that the bracket end surface abuts the side rail outer surface and the first, second and horizontal wall portions extend generally perpendicular from the side rail outer surface, and welding the bracket to the side rail by providing a first weld bead portion along the junction between the outwardly facing side of the first wall portion and the side rail outer surface and extending the first weld bead portion along the side rail outer surface beyond the lower end of the first wall portion and substantially to the lower end of the web, providing a second weld bead portion along the junction between the outwardly facing side of the second wall portion and the side rail outer surface and extending the second weld bead portion along the side rail outer surface beyond the lower end of the second wall portion and substantially to the lower end of the web, providing a third weld bead portion along the junction between the horizontal wall portion and the side rail outer surface, providing a fourth weld bead portion along the junction between the inwardly facing side of the first wall portion and the side rail outer surface and extending the fourth weld bead portion along the side rail outer surface beyond the lower end of the first wall portion and substantially to the lower end of the web, providing a fifth weld bead portion along the junction between the inwardly facing side of the second wall portion and the side rail outer surface and extending the fifth weld bead portion along the side rail outer surface beyond the lower end of the second wall portion and substantially to the lower end of the web, providing a sixth weld bead portion along the side rail inner surface in opposed relation to the end surface of the first wall portion, the sixth weld bead portion extending from a point above the lower end of the first wall portion substantially to the lower end of the web, and providing a seventh weld bead portion along the side rail inner surface in opposed relation to the end surface portion of the second wall portion, the seventh weld bead portion extending from a point above the lower end of the second wall portion substantially to the lower end of the web.

9. A method of assembling a motor vehicle frame as set forth in claim 8 wherein each of the first, second and third weld bead portions form part of a single continuous weld bead.

10. A method for assembling a motor vehicle frame including a rail having a generally planar outer surface with a generally horizontal outer edge, and a member including a wall portion having a generally straight end surface, said method comprising the steps of
positioning the member against the rail outer surface so that the wall portion extends transversely to the rail outer surface spaced from said rail outer edge, and the end surface of the wall portion substantially abuts the rail outer surface, and
using a robotically controlled gun of an automatic welding device to weld the member to the rail by providing a weld bead in a generally straight line along the junction between the wall portion and the rail outer surface and continuing to extend in said generally straight line the weld bead along the rail outer surface toward said rail outer edge substantially beyond the wall portion, so that said weld bead further stiffens the rail by thickening the rail beyond the wall portion.

11. A method for assembling a motor vehicle frame as set forth in claim 10 wherein the rail includes a web having the surface and having upper and lower ends, wherein the wall portion includes upper and lower ends, and wherein said step of welding the member to the rail includes extending the weld bead beyond the lower end of the wall portion substantially to the lower end of the web.

12. A method for assembling a motor vehicle frame as set forth in claim 10 wherein the wall portion has opposite sides, and wherein said step of welding the member to the side rail includes providing the weld bead along the junction between the rail surface and the wall portion on one of the sides of the wall portion, and applying a second weld bead along the junction between the rail surface and the wall portion on the other of the sides of the wall portion, the second-mentioned weld bead extending along the rail surface substantially beyond the end surface of the wall portion.

13. A method for assembling a motor vehicle frame as set forth in claim 10 wherein the rail includes a second surface opposite the first-mentioned surface, and wherein said method for assembling further comprises the step of providing a second weld bead to the second surface of the rail and in opposed relation to the first-mentioned weld bead and extending the second weld bead along the second surface of the rail substantially beyond the end surface of the wall portion.

* * * * *